United States Patent [19]

Caneba et al.

[11] Patent Number: 4,659,470
[45] Date of Patent: Apr. 21, 1987

[54] THERMAL CASTING PROCESS FOR THE PREPARATION OF ANISOTROPIC MEMBRANES AND THE RESULTANT MEMBRANE

[75] Inventors: Gerard T. M. Caneba; David S. Soong, both of Albany, Calif.

[73] Assignee: The United States of America as represented by the United States Department of Energy, Washington, D.C.

[21] Appl. No.: 753,515

[22] Filed: Jul. 10, 1985

[51] Int. Cl.⁴ .............................. C08J 9/28; C08J 9/34; B29C 39/38
[52] U.S. Cl. ........................ 210/500.21; 210/500.32; 264/41; 264/45.5; 264/48; 264/237; 264/348; 521/51
[58] Field of Search .................. 264/41, 48, 237, 348, 264/45.5; 521/51

[56] References Cited

U.S. PATENT DOCUMENTS

| | | | |
|---|---|---|---|
| 3,945,926 | 3/1976 | Kesting | 210/500 M |
| 4,035,459 | 7/1977 | Kesting | 264/49 |
| 4,247,498 | 1/1981 | Castro | 264/41 |
| 4,264,447 | 4/1981 | Nicolet | 210/500.2 |
| 4,333,972 | 6/1982 | Kesting | 427/244 |
| 4,387,024 | 6/1983 | Kurihara et al. | 210/490 |

*Primary Examiner*—Philip Anderson
*Attorney, Agent, or Firm*—Harold M. Dixon; Roger S. Gaither; Judson R. Hightower

[57] ABSTRACT

A method for providing anisotropic polymer membranes from a binary polymer/solvent solution using a thermal inversion process. A homogeneous binary solution is cast onto a support and cooled in such a way as to provide a differential in cooling rate across the thickness of the resulting membrane sheet. Isotropic or anisotropic structures of selected porosities can be produced, depending on the initial concentration of polymer in the selected solvent and on the extent of the differential in cooling rate. This differential results in a corresponding gradation in pore size. The method may be modified to provide a working skin by applying a rapid, high-temperature pulse to redissolve a predetermined thickness of the membrane at one of its faces and then freezing the entire structure.

17 Claims, 2 Drawing Figures

THERMAL CASTING PROCESS FOR THE PREPARATION OF ANISOTROPIC MEMBRANES AND THE RESULTANT MEMBRANE

FIELD OF THE INVENTION

The present invention relates generally to polymer membranes, and more particularly relates to a thermal inversion process of preparing polymer membranes from a binary solution using a thermal casting process.

BACKGROUND OF THE INVENTION

The Government has rights in this invention pursuant to Contract No. DE-APO3-84SF15389 awarded by the U.S. Department of Energy.

Synthetic polymer membranes are useful in a number of important industrial applications, such as in large-scale filtration and separation operations. "Anisotropic" membranes, to which the present invention is primarily directed, have a continuous gradation in pore size between one side of the membrane and the other, and are particularly useful in certain microfiltration and ultrafiltration applications.

Since their discovery in the early 1960's, anisotropic membranes have been prepared using a phase inversion technique. The classical phase inversion method involves spreading a thin coating of a polymer/solvent solution on a solid support and then coagulating the solution with a nonsolvent. The system is thus ternary, involving three components: a polymer, a solvent, and a nonsolvent. U.S. Pat. No. 3,945,926, for example, which shows the preparation of membranes composed of polycarbonates and copolymers of polycarbonates, discloses the use of the classical phase inversion method. U.S. Pat. No. 4,333,972, which shows a method of preparing anisotropic cellulose-based membranes, uses a phase inversion method as well. A disadvantage of the ternary system is that controlling the desired pore configuration, i.e. sizes, distribution, etc., is difficult. During coagulation, nonsolvent penetrates into the polymer coating, while solvent diffuses into the nonsolvent. Regions depleted of solvent and penetrated by the nonsolvent begin to phase separate, since the local compositions correspond to points inside the two-phase envelope of the particular polymer/solvent/nonsolvent ternary diagram. Interaction between the polymer, solvent and nonsolvent in the phase inversion procedure thus involves a combination of complicated transport and thermodynamic phenomena.

A simplified, binary system for preparing polymer membranes is disclosed in U.S. Pat. No. 4,247,498 to Castro, the disclosure of which is hereby incorporated by reference in its entirety. That patent teaches that it is possible to eliminate the use of the nonsolvent while nevertheless maintaining a desired pore size. Coagulation is achieved by a controlled reduction in temperature rather than by use of a nonsolvent. The polymer structures described in that patent are produced by heating the selected polymer with a compatible liquid to form a homogeneous solution, and cooling the solution on an appropriate substrate. Liquid may then be extracted to form a microporous material. The final structures are characterized by a relatively homogeneous cellular structure having cells connected by pores of smaller dimension. These microporous products are substantially isotropic, however, having essentially the same cross-sectional configuration when analyzed along any spatial plane. Thus, there is a need in the art for a simplified process of preparing anisotropic membranes from a binary solution. The present invention is primarily addressed to this need, and provides such a method.

Membranes prepared by the method of the present invention may, in addition to being either anisotropic or isotropic, depending on the process parameters selected, be either "skinned" or "unskinned." "Skinned" membranes are well-known in the art (see, e.g., U.S. Pat. No. 4,035,459) and includes a relatively nonporous outer layer with the remainder of the membrane being relatively porous. Such membranes are extensively used in energyrelated applications, such as in gas separations, seawater desalination, and concentration of biotechnology products. The surface skin typically has a thickness roughly equal to that of one cell wall, although this thickness can vary. The skin may be impervious to passage of liquids or may exhibit some degree of porosity. Generally, in skinned membrane structures, the thin dense surface layer provides adequate selectivity, while the porous substructure of the bulk imparts mechanical rigidity. This type of membrane is thus ideally suited for a number of separation operations.

SUMMARY OF THE INVENTION

Accordingly, it is an object of the present invention to provide a flexible and relatively uncomplicated process for the preparation of anisotropic polymer membranes.

It is another object of the invention to provide a thermal casting process for the preparation of anisotropic polymer membranes using a binary polymer/solvent solution.

It is still another object of the invention to provide a process of preparing reproducible anisotropic polymer membranes having a wide range of porosities.

It is yet another object of the invention to provide a process of preparing anisotropic polymer membranes by casting a polymer solution on a solid support, and then insulating one face of the membrane while the other face is cooled.

It is a further object of the invention to provide such a process using a polar polymer and a viscous, polar solvent selected such that the possibility of hydrogen-bonding or other dipolar or ionic interactions is created.

It is still a further object of the invention to provide a process of preparing a skinned polymer membrane, either isotropic or anisotropic, from a binary solution using a thermal casting process, wherein a predetermined thickness of a face of the coagulated membrane is redissolved by means of a rapid, hightemperature pulse and then frozen to form a relatively nonporous skin.

It is another object of the invention to provide both skinned and unskinned polymer membranes by the methods outlined above.

Further objects and advantages of this invention will become apparent from the study of the following portion of the specification, the claims and the attached drawings.

In one aspect of the present invention, the method for preparing an anisotropic polymer membrane includes providing a binary polymer/solvent solution, spreading the solution onto a solid support to provide a thin sheet, and cooling one face of the sheet while insulating the other face. A membrane having a gradient porosity profile can thus be produced. Preferred polymers for practice of the method include polar polymers such as those containing carbonyl groups. Particularly preferred polymers include acrylates, polyamides and cellulose esters such as cellulose triacetate. Compatible liquids are preferably viscous, polar compounds which can hydrogen-bond with the selected polymer and create dipolar or ionic interactions. In a preferred embodiment, 1,1-tetrahydrothiophene dioxide (sulfolane), glycerol, dimethylsulfoxide, and n-methyl-2-pyrrolidone, are the selected solvents.

In another aspect of the invention, the method for preparing membranes includes an additional step wherein the resultant membrane, either isotropic or anisotropic, is provided with a relatively nonporous skin. This additional step involves redissolving a predetermined thickness of the membrane initially prepared with a rapid, high-temperature pulse, and then freezing the entire structure.

DETAILED DESCRIPTION OF THE INVENTION

Figure 1:
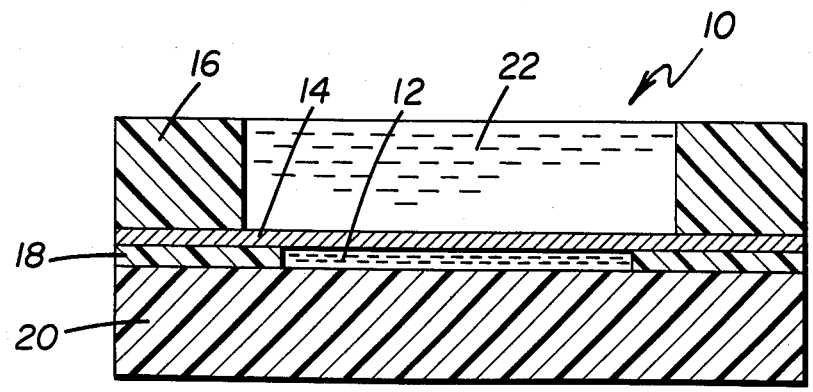
FIG. 1 is a side, cross-sectional view of a casting cell which may be used with the method of the present invention.

The present invention is thus a method for preparing polymer membranes from a binary polymer/solvent solution using a modified thermal inversion method.

In a preferred embodiment of the invention, an anisotropic membrane is prepared using a solution of polymer in a compatible liquid at a predetermined concentration. The solution is maintained at a temperature sufficient to ensure homogeneity. For a solution of polymethylmethacrylate (PMMA) in sulfolane, for example, a temperature of about 80° C. is appropriate. The heated solution is then cast onto a solid support and cooled as follows. One face of the membrane is maintained at a temperature above the phase separation envelope, and is preferably insulated. The temperature of the other face of the membrane is lowered to a point below the phase separation envelope. The phase separation initiated by this latter process propagates gradually inwards as the temperature of successive fluid layers drops by continuous heat removal. The resultant membrane is then frozen and solvent is leached out. Since a faster cooling rate produces a smaller pore size, the resultant membrane has a gradient pore size profile, in which the larger pores are closer to the face of the membrane that was insulated during cooling and the smaller pores are closer to the face of the membrane which cooling was initiated.

Like the method disclosed in U.S. Pat. No. 4,247,498 to Castro, a wide variety of polymers may be successfully used with the present method. Suitable polymers for use in the practice of the inventive method are polar, and thus include polymers containing functional groups such as esters, amides, carboxylic acids and carboxylic acid salts, aldehydes, ketones, alcohols, halogen substituents, nitro groups, cyano groups and amines. Preferred polymers include acrylates, polyamides and cellulose esters, and of these, polymethylmethacrylate, nylon and cellulose triacetate are particularly preferred.

After selection of a polymer, an appropriate compatible liquid must be chosen. Since the polymer and solvent are to be heated to prepare a clear, homogeneous solution prior to casting, a solvent must be selected so that such a solution may be prepared. Since polar polymers are preferable here, any corresponding solvent selected should also be polar in order to effect solution, i.e., the enthalpy of mixing of the two components should be large. Suitable solvents thus include those which are comparable in polarity to the corresponding polymer, and preferred solvents are furthermore substantially viscous at the temperatures used in membrane formation. Viscosities of about 5 to about 15 cp are suggested. Preferred solvents are also those which are capable of hydrogen-bonding with the selected polymer and which can create dipolar or ionic interaction in solution. Particularly preferred solvents include sulfolane, glycerol, dimethylsulfoxide and n-methyl-2-pyrrolidone. However, any number of solvents can be used in the practice of the present invention as long as they substantially fit the suggested profile outlined above.

The desired concentration of polymer in the initial solution is dependent on several factors. First, when a larger pore size is desired, a lower concentration is appropriate. Very low concentrations (less than about 10 wt. %) will result in a highly porous, isotropic, open structure, while relatively high concentrations (greater than about 20 wt. %) will result in a fairly dense, substantially isotropic structure. Median concentrations of about 10 wt. % to about 20 wt. % will yield anisotropic structures. A particularly preferred composition for that purpose is about 10 wt. %. It should be noted here, however, that by varying the initial concentration or the cooling rate, different kinds of structures may be provided: isotropic or anisotropic, porous or dense, etc.

Other factors determining the selected initial concentration include the following. The concentration will depend on the strength required of the finished membrane in that a stronger membrane will require a higher concentration of polymer. Also, different concentrations will be required for different polymers, since in each case a different minimum amount of polymer is needed in order for the membrane to retain a desired shape. Finally, a lower concentration is required with polymers having higher molecular weights.

Anisotropic membranes prepared by the inventive method exhibit a graded pore size profile, as determined from scanning electron micrographs of thermal-cast membranes from PMMA/sulfolane solutions. The top portion adjacent to the cooling medium during casting has smaller pores, of about 0.1–0.2 $\mu$m, while the center of the cross section consists essentially of 1-$\mu$m honeycombed cells bounded by about 0.3 to about 0.5 $\mu$m open pores. The bottom, insulated, surface of the membrane shows pores having a diameter of about 2 to about 15 $\mu$m. Thus, from one face of the membrane to the other, the pore size gradually changes from about 0.1 to about 15$\mu$m, clearly displaying a high degree of anisotropy.

If desired, an additional step may supplement the method outlined above in order to provide a membrane having a dense skin layer. After preparation of a membrane, a quick high-temperature pulse may be applied to the insulated (or heated) side of the membrane after the coagulation step. The pulse may be applied using either heated water or heated air; heated water is preferable. This rapid pulse will cause a small portion of the membrane to dissolve. The temperature and duration of the pulse will depend on the desired skin thickness, since the longer heat is applied to the surface, the thicker the skin. Thus, the dense surface layer thickness can be altered according to the requirements of its proposed function. Where higher selectivity is desired, more heat should be applied to provide a higher density skin. Generally an 80° C. pulse of about a ten second duration is sufficient to provide a working skin of about 1% to 20% of the total membrane thickness.

Figure 2:
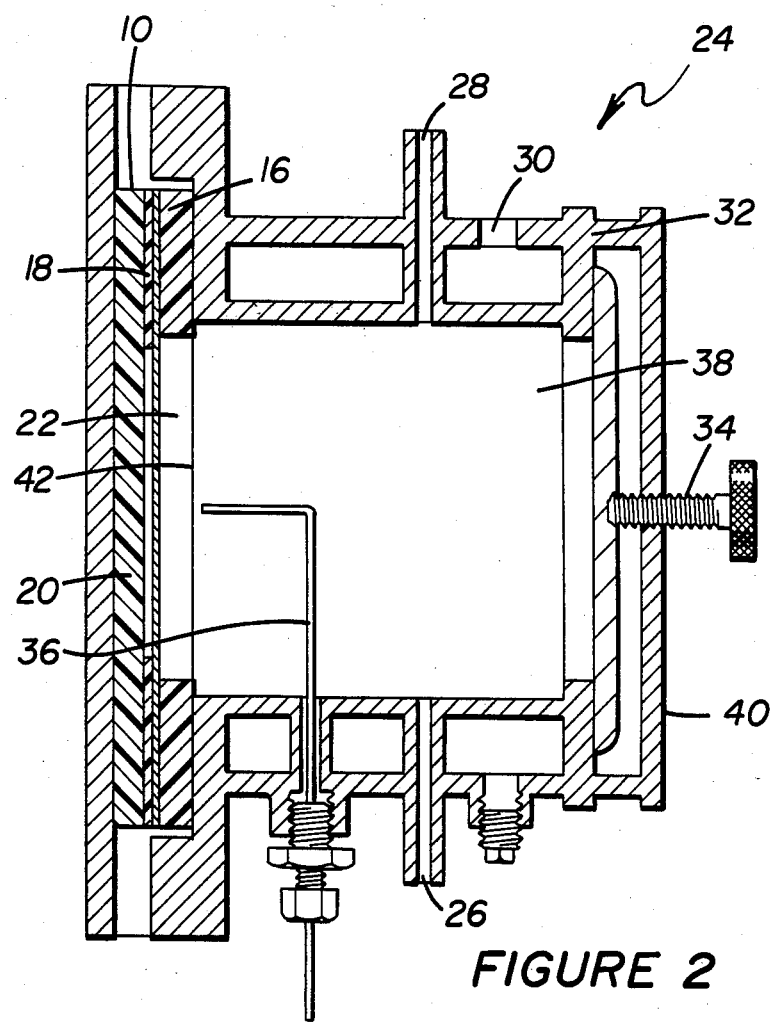
FIG. 2 is a cross-sectional view of a casting cell assembly.

In order to provide an anisotropic membrane according to the present invention, any apparatus which can accomplish the gradation in cooling rate across the thickness of the membrane may be used. One such apparatus is illustrated in FIGS. 1 and 2. In FIG. 1, a casting cell is shown generally at 10, with a polymer solution cast into a membrane 12 adjacent a thin metallic sheet 14. Thermal insulating blocks 16, 18, and 20 are preferably made of Teflon but can be constructed out of any material that is a good thermal insulator. Metallic sheet 14 is disposed between membrane 12 and cell 22, which houses fluid, preferably water, at a selected temperature, such that the polymer solution in contact with the metal is in thermal equilibrium with the fluid temperature in cell 22.

FIG. 2 illustrates casting cell 10 emplaced within casting cell assembly 24. Temperature is controlled by means of thermocouple 36 disposed within cavity 38, into which water may be input through inlet 26 and may exit through outlet 28. Liquid nitrogen may be poured into opening 30 so as to circulate throughout surrounding chamber 32. Fastener screw 34 holds temperature control assembly 40 in place adjacent casting cell 10, such that cell 22 is in thermal equilibrium with cavity 38 by means of conducting wall 42.

While the invention has been described in conjunction with preferred specific embodiments thereof, it is to be understood that this description, including the examples which follow, is intended to be illustrative of certain aspects and embodiments of the present invention, and is not intended to limit the scope of the invention which is defined by the appended claims.

EXAMPLE 1

Three solutions of reagent grade atactic polymethylmethacrylate (Aldrich Chemical Co., min. mol. wt. approximately 100,000) in sulfolane were prepared having concentrations of about 5 wt. %, 10 wt. % and 15 wt. %. Particulate contaminants were removed through high temperature vacuum filtration. The following procedure was then followed for each of the three polymer solutions.

In order to ensure homogeneity, each solution was heated to about 80° C. and stirred in its container for about an hour prior to casting. The solution was then poured into the casting cell, and the casting cell mounted inside the casting cell assembly (see FIGS. 3 and 4). Air at a temperature of about 80° C., a temperature sufficiently above the critical temperatures (about 50°-60° C.) of the binary mixtures, was blown continuously through the cell for about 15 minutes. Water at the coagulating temperature (approximately 30° C.) was run through the assembly for about 30 minutes, initiating phase separation at one face of the membrane, which phase separation then propagated gradually through to the other face of the membrane. A gradation in cooling rate across the membrane was thus provided, resulting in a corresponding gradation in pore size distribution, with a faster cooling rate corresponding to a smaller pore size and a slower cooling rate corresponding to a larger pore size. Finally, to freeze the polymer structure of the coagulated mixture, the casting cell assembly was opened and air was blown through the opening, while liquid nitrogen was poured into the annular structure surrounding the assembly. The temperature of the system was then lowered to about 0° C. (i.e., below the freezing point of the solvent) for about 15 minutes. The cell was opened and the membrane removed and immersed in water in order to allow the solvent to leach out. Membranes were stored in water in preparation for characterization work.

Scanning electron microscopy studies were then carried out as follows. Wet membranes as prepared above were first freeze-dried at −6.5° C., ensuring complete retention of the pore structures of the membranes. Membranes prepared as above, having a thickness of about 200–500 $\mu$m and an area of about 2 sq. cm. were freeze-dried for about 2 hours. In order to expose the cross sections, these dried membranes were cracked in liquid nitrogen. The cracked pieces were mounted on an SEM sample stage, and coated with gold. The coated samples were viewed and photographd with a scanning electron microscope at magnifications ranging from 100X to 15,000X.

For the membrane prepared from the 15 wt. % solution, pores adjacent the cooled surface had diameters ranging from about 0.1 to about 0.2 $\mu$m, while cells in the center of the membrane were about 1-$\mu$m in diameter bounded by 0.3 to about 0.5 $\mu$m open pores, and pores at the insulated surface ranged from about 2 to about 15 $\mu$m in diameter. Anisotropy was thus displayed.

The membrane prepared from the 5 wt. % solution was essentially isotropic, and showed cells of about 2 $\mu$m connected by pores of about 1 $\mu$m. A higher concentration is thus required for anisotropy in this system.

The membrane prepared from the 15 wt. % solution, like the membrane obtained from the 10 wt. % solution, also exhibited a graded pore size profile, but had, in general, smaller pores. Pores in the layer adjacent the cooling medium had diameters of less than 0.1 $\mu$m, while the central section of the membrane showed 0.5-$\mu$m pores, and the lower, insulated layer, showed pores of about a 1-$\mu$m diameter.

The overall thickness of the membranes prepared was about 300$\mu$. However, depending on membrane requirements, membranes of about any thickness may be prepared by the method as outlined above.

EXAMPLE 2

In order to prepare a membrane having a relatively nonpourous working skin, the following step was carried out after preparation of the membranes according to the method as set out in Example 1. In this step, a rapid high-temperature pulse was applied to one face of the membrane, using heated water, so that a thin layer adjacent that face of the membrane was redissolved. A pulse of about 80° C. for about ten seconds was applied. The membrane was then frozen for about fifteen minutes in ice water. This latter step provided a working skin composed of a plurality of very small cells near and at the surface.

What is claimed is:

1. A method for making an anisotropic polymer membrane, comprising the steps of:
   providing a binary solution at an initial temperature having a predetermined concentration of a polymeric component dissolved in a solvent;
   casing said binary solution onto a substrate so that a predetermined shape is formed, said shape having a first face, an oppositely disposed second face, and an interior therebetween; and, reducing said initial temperature adjacent said first face at a first cooling rate, while reducing said initial temperature at said second face at a second cooling rate, said second cooling rate being slower than said first cooling rate, so that as said initial temperature at said first face is reduced, said interior develops a graded pore size distribution, with pores decreasing in size from said second face toward said first face.

2. The method of claim 1, wherein said polymeric component and said solvent are substantially polar.

3. The method of claim 2, wherein said initial temperature of said binary solution is selected so as to ensure substantial homogeneity prior to said casting.

4. The method of claim 3, wherein said polymeric component comprises a polymerized hydrocarbon compound containing at least one functional group selected from the group consisting of esters, amides, carboxylic acids, carboxylic acid salts, aldehydes, ketones, alcohols, halogen substituentss, nitro groups, cyano groups and amines.

5. The method of claim 4, wherein said polymeric component is selected from the group consisting of acrylates, polyamides and cellulose esters.

6. The method of claim 5, wherein said polymeric component is selected from the group consisting of polymethylmethacrylate, nylon and cellulose triacetate.

7. The method of claim 1, wherein said solvent is substantially viscous.

8. The method of claim 7, wherein said solvent has a viscosity ranging from about 5 centipoise to about 15 centipoise.

9. The method of claim 8, wherein said solvent is selected from the group consisting of 1,1-tetrahydrothiophene dioxide, glycerol, dimethylsulfoxide, and n-methyl-2-pyrrolidone.

10. The method of claim 1, wherein said concentration of said polymeric component in said binary solution is selected so that substantial structural integrity and a predetermined pore size are provided.

11. The method of claim 10, wherein said concentration ranges from about ten percent by weight to about twenty percent by weight.

12. The method of claim 11, wherein said concentration is about ten percent by weight.

13. A method for making a skinned polymer membrane, said membrane being either isotropic or anisotropic, comprising the steps of:

providing a binary solution having a predetermined concentration of a polymeric component dissolved in a solvent;

casting asid binary solution onto a substrate so that a predetermined shape is provided having a first face, an oppositely disposed second face, and an interior therebetween;

reducing said initial temperature adjacent said first face at a first cooling rate, while reducing said initial temperature adjacent said second face at a second cooling rate, said first and second cooling rates being determined by the desired degree of an anisotropy and porosity;

dissolving a predetermined thickness of said interior adjacent said first face of said symmetric membrane;

reducing the temperature at said first face, whereby said dissolved thickness of said interior coagulates to form a relatively nonporous skin on said membrane.

14. The method of claim 13, wherein said dissolving of said predetermined thickness comprises application of a rapid, high-temperature pulse to said first face.

15. The method of claim 14, wherein said concentration ranges from about 4 wt. % to about 20 wt. %.

16. An anisotropic polymeric membrane prepared by the method of claim 1.

17. A skinned polymer membrane prepared by the method of claim 13.

* * * * *